Patented Jan. 5, 1937

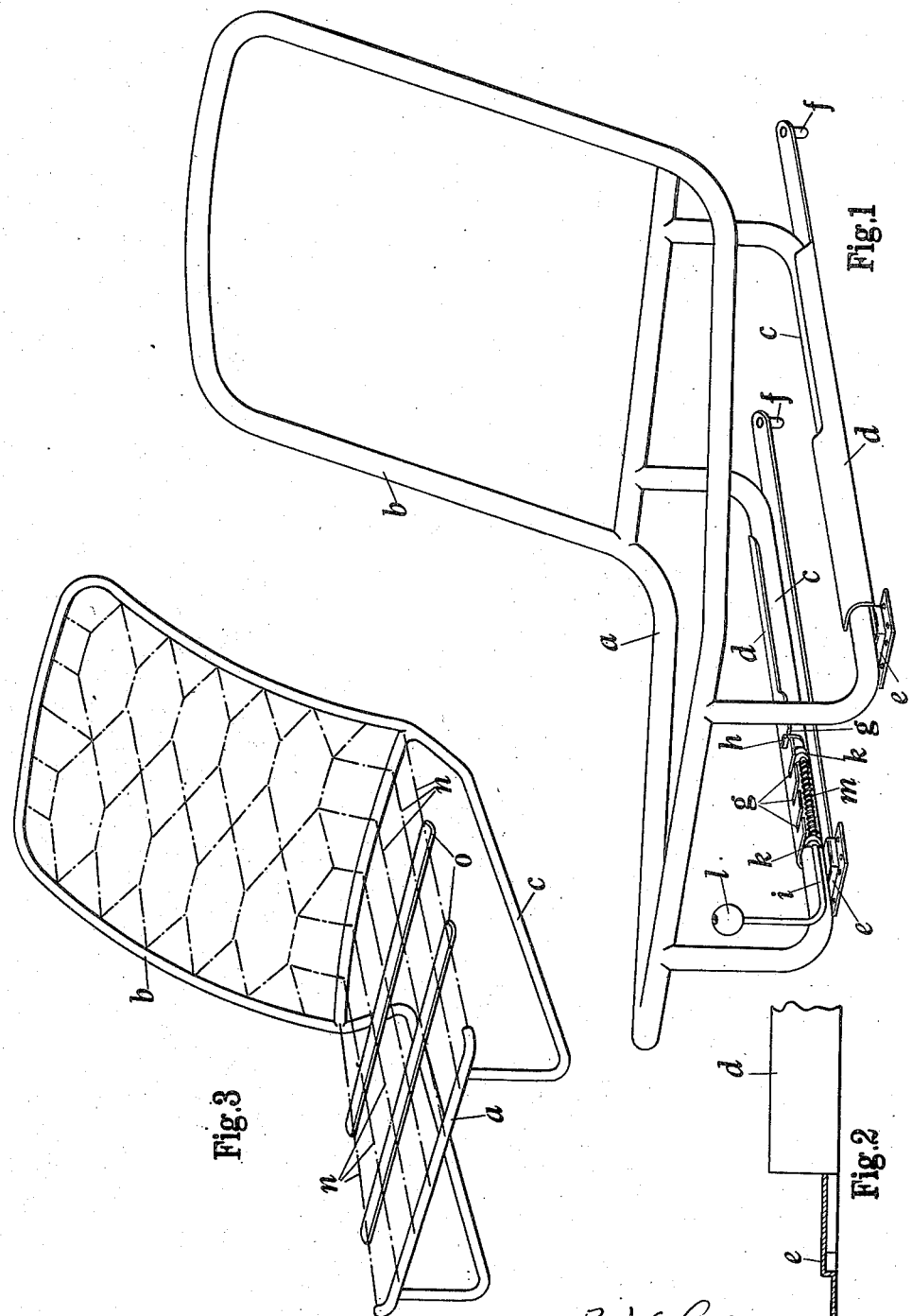

2,066,557

UNITED STATES PATENT OFFICE 2,066,557

MOTOR VEHICLE SEAT

Rowland Wilton Cox, Putney, London, England

Application December 9, 1935, Serial No. 53,663
In Great Britain December 15, 1934

5 Claims. (Cl. 155—14)

This invention relates to adjustable motor vehicle seats.

The invention comprises a pair of guides for the runners on the seat frame, each guide being in the form of a channel having its opening disposed at one side of the guide, and one of the guides having a notched upper flange with which can be adjustably engaged a locking device carried by the adjacent runner.

Further the invention comprises a guide construction in which one end of the guide is adapted to be detachably engaged with an attachment piece which can be secured to the floor of the vehicle, the other end of the guide being adapted to be secured directly to the floor.

The invention also comprises a seat frame having combined with its underside a pair of parallel horizontal runners made from metal tubes or rods and situated nearer together than the sides of the seat portion of the frame, the said runners being adapted to co-operate with the guides aforesaid.

In the accompanying sheet of explanatory drawings:—

Figure 1 is a perspective view showing a seat frame and guides therefor constructed in accordance with the invention.

Figure 2 is a detail view showing the manner of securing one end of the guide to the floor of the vehicle.

Figure 3 is a perspective view to a smaller scale than Figure 1 showing a modified seat frame.

In carrying the invention into effect as shown in Figures 1 and 2, the whole of the seat frame including the seat portion $a$ and the back support $b$ is made from metal tube. Beneath the seat portion $a$ are provided a pair of parallel and horizontal runners $c$ made from tube. Each runner $c$ has its end portions bent upwardly and attached to the front and rear members of the portion $a$. The runners $c$ are arranged as shown, nearer together than the sides of the seat portion $a$ so that the sides of the said portion $a$ extend beyond or overhang the runners $c$.

Each of the pair of guides $d$ in which the runners $c$ are retained when the seat is mounted in position, is made by bending a strip of metal to form a channel having an open side. In the arrangement shown the guides $d$ are so disposed that the open side of each is directed towards the open side of the other. Alternately the guides may be so arranged that the open side of each is directed away from that of the other. If desired the open sides of the two guides may face in the same direction, but either of the two other arrangements is preferred.

The forward end of each guide $d$ is adapted to be slipped under an attachment piece $e$ (shown in section in Figure 2) which is secured to the floor of the vehicle by screws or other convenient fastenings. The rear end of the guide $d$ is secured to the floor directly by means of a screw or other convenient means which may pass through a rubber or other expansible bush $f$ provided at the rear end of the guide $d$ and arranged to fit into a hole in the floor.

Along the inner edge of the overhanging upper side of one of the guides $d$ a series of notches $g$ is provided, and any notch can be engaged by the upturned end $h$ of a locking rod $i$ rotatably mounted in lugs $k$ on the adjacent runner $c$, the rod $i$ being provided with an operating knob $l$ and being acted upon by a helical spring $m$ which maintains the end $h$ of the rod $i$ in engagement with one of the notches $g$.

Adjustment of the seat is effected by rotating the rod $i$ against the action of the spring $m$ to disengage the end $h$ from a notch $g$ and moving the seat frame to any desired position along the guides $d$, the end $h$ being subsequently engaged with the appropriate notch $g$.

To detach the seat from the floor, the fastening at the rear end of one or each guide $d$ is released, and the guide is disconnected from its attachment piece $e$. The seat frame can then be separated from the guides $d$. Replacement of the seat is effected by the reverse operation.

The modified seat frame shown in Figure 3 differs from that of Figure 1 in that the horizontal side members of the seat supporting portion $a$ are omitted, the seat proper being supported on wires or springs $n$ secured to the front and rear members of the seat portion and provided with transverse metal or other strips $o$. The runners are formed as continuations of of the lower ends of the sides of the back support, the tube from which those parts are made being deflected inwardly at the bottom of the back support to bring the runners within the width of the seat support as already described.

By this invention I am able to provide an adjustable seat for a motor vehicle in a very simple and convenient manner.

Whilst it is preferred to make the seat frame and runners from metal tubes they may be made from solid rods.

The invention is not limited to the examples above described as subordinate details may be varied. Thus one of the guides may be permanently fixed to the floor of the vehicle, the other only being removable. Also instead of making each guide from a single piece, it may be made from two relatively short pieces adapted to be secured to the floor of the vehicle.

Having thus described my invention what I claim as new and desire to secure by Letters Patent is:—

1. An adjustable motor vehicle seat comprising a seat frame, a pair of runners on the seat frame, a pair of guides for the runners, each guide having the form of a channel arranged with its opening at one side, a notched upper flange on one of the guides, and a locking device carried by the corresponding runner for adjustable engagement with the notched flange, substantially as described.

2. An adjustable motor vehicle seat as claimed in claim 1 and comprising attachment means whereby each guide is secured at its ends to the floor of the vehicle, said means including an attachment piece detachably embracing one of said ends, substantially as described.

3. An adjustable motor vehicle seat comprising a metallic seat frame having front, rear and side members, and having combined with its underside a pair of horizontal metallic runners arranged in parallel relationship and situated nearer together than the side members of the seat frame, a pair of guides for the runners, each guide having the form of a channel arranged with its opening at one side, a notched upper flange on one of the guides, and a locking device carried by the corresponding runner for adjustable engagement with the notched flange, substantially as described.

4. An adjustable motor vehicle seat as claimed in claim 3, in which the whole of the seat frame is made from metal tube, and in which the end portions of the the runners are bent upwardly and attached to the front and rear members of the seat frame at points intermediate their ends, substantially as described.

5. An adjustable motor vehicle seat comprising a metallic seat frame having a seating portion provided with tubular front and rear members and with flexible members extending between and secured at their ends to the said tubular members, and having combined with its underside a pair of horizontal metallic tubular runners situated nearer together than the sides of the seating portion formed by the outermost flexible members, a pair of guides for the runners, each guide having the form of a channel arranged with its opening at one side, a notched upper flange on one of the guides, and a locking device carried by the corresponding runner for adjustable engagement with the notched flange, substantially as described.

ROWLAND WILTON COX.